3,329,072
Patented July 4, 1967

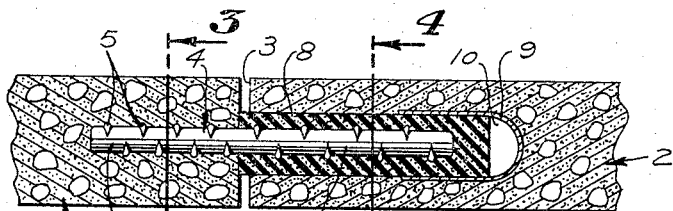
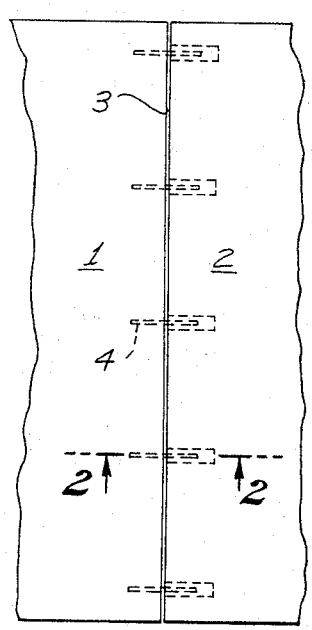
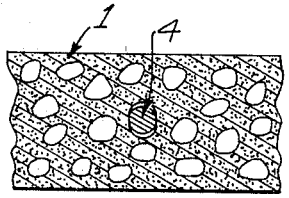
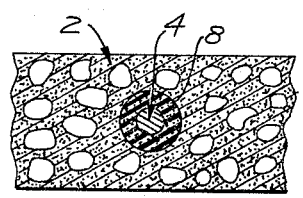
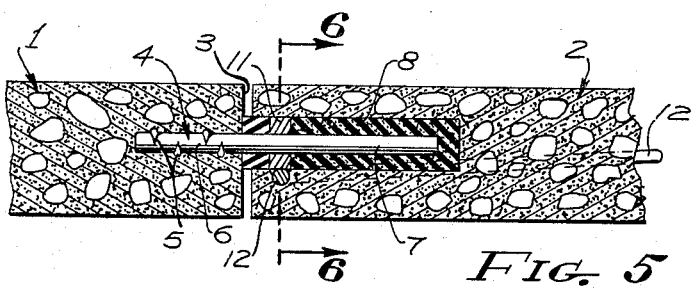
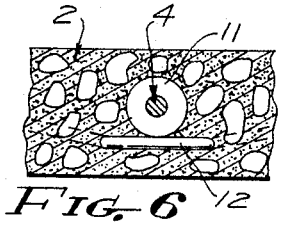
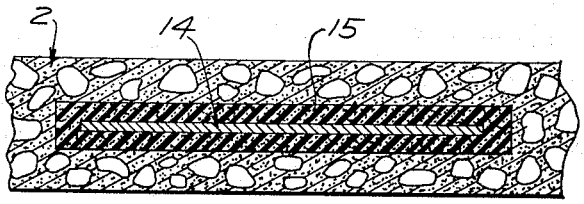
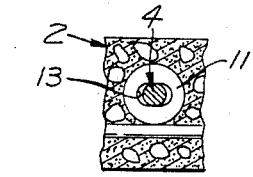
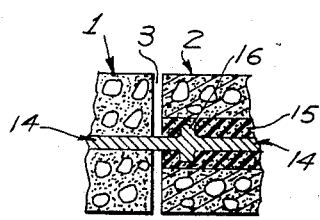
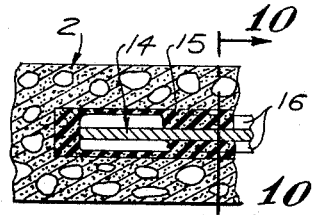
INVENTOR.
EDWARD K. RICE
BY
ATTORNEYS

United States Patent Office

3,329,072
YIELDABLE CONNECTOR FOR CONCRETE SUBSTRUCTURES
Edward K. Rice, 2731 N. Beverly Glen, Los Angeles, Calif. 90024
Filed Apr. 6, 1964, Ser. No. 357,602
4 Claims. (Cl. 94—18)

This invention relates to yieldable connectors for concrete structures. It is essential to provide expansion joints between sections or components of concrete structures; however, expansion joints often permit excessive relative movement or excessive restraint arising from shrinkage, temperature changes, foundation settlement, or the like.

A primary object of this invention is to provide a yieldable connector which permits normal functioning of the expansion joint by allowing limited movement in any or predetermined directions, yet is capable of transmitting essential loads between the connected structural sections.

A second object of this invention is to provide a yieldable connector between concrete structures wherein a relatively rigid connecting member is bonded to one structure, and extends into a socket of a mating structure which is filled with a yieldable material, such as an elastomer.

A third object is to provide a yieldable connector which may be predesigned to offer the required resistance to movement by varying the elastomer from a sponge material to a relatively rigid material, or by providing voids between the elastomer and the concrete.

A fourth object is to provide a yieldable connector of this type in which the connecting element may be in the nature of a rod or in the nature of a plate.

A fifth object is to provide a yieldable connector which may be modified to restrict relative movement in selected directions to meet the requirements of the structure in which it is used.

With the above and other objects in view, as may appear hereinafter, reference is directed to the accompanying drawings in which:

FIGURE 1 is a fragmentary, plan view of the adjacent portions of a pair of structural sections or components joined by several of the yieldable connectors;

FIGURE 2 is an enlarged, fragmentary, sectional view taken through 2—2 of FIGURE 1;

FIGURE 3 is a fragmentary, transverse, sectional view taken through 3—3 of FIGURE 2;

FIGURE 4 is a fragmentary, sectional view taken through 4—4 of FIGURE 2;

FIGURE 5 is a fragmentary, longitudinal, sectional view, similar to FIGURE 2, showing a modified form of the connector wherein a collar restricts movement thereof;

FIGURE 6 is a fragmentary, transverse, sectional view taken through 6—6 of FIGURE 5;

FIGURE 7 is a fragmentary, sectional view similar to FIGURE 6, showing a modified form of the collar;

FIGURE 8 is a fragmentary, sectional view similar to FIGURE 2, showing a modified connector wherein a plate is substituted for the connector rod;

FIGURE 9 is a fragmentary, sectional view similar to FIGURE 8, showing the addition of movement-restricting ribs on the connector plate;

FIGURE 10 is a fragmentary, sectional view taken through 10—10 of FIGURE 9.

Reference is first directed to FIGURES 1 through 4. A pair of concrete structural sections or components 1 and 2 are positioned or cast in confronting relation, forming therebetween an expansion joint 3 which ultimately may be filled with a yieldable material, not shown. The structural section 1 and 2 may be concrete slabs, beams, or other concrete structural sections, and therefore may take many forms. However, in each case portions of the structural sections are disposed in confronting relation to to form the expansion joint 3.

The yieldable connector shown in FIGURES 1 through 4 includes a core member 4 in the form of a rod which may be circulator or square, and in the latter case may be twisted. The core member 4 may also have nodules 5 on at least a first portion 6 thereof. The remaining or second portion 7 of the core member 4 is encased in a sleeve 8 formed of rubber, or other elastomer, and is either mechanically interlocked therewith or is bonded thereto, or may be both mechanically interlocked and bonded thereto.

In order that the core member 4 may move axially, laterally, or tiltably relative to the sleeve 8, the sleeve may be porous, or voids may be provided between the sleeve and concrete. In the latter case, a cap or cover 9 of sheet metal may be furnished to provide suitably disposed voids such as the void 10 shown in FIGURE 2.

In the course of casting the structural sections 1 and 2, the first portions 6 of a plurality of core members 4 are cast directly in the concrete and bonded thereto. The second portions 7 surrounded by the elastomer sleeve 8 are cast within the second structural section.

The resulting connection provided between the structural sections 1 and 2 allows for limited translational and pivotal relative movement between the concrete structural sections. The extent of this movement depends upon the thickness of the elastomer sleeve 8 and the volume and location of the pores or voids.

The degree of relative movement between the concrete structures may be modified by providing a collar 11, as show in FIGURES 5 and 6, secured to or slidable on the second portion 7 near the first portion 6. The collar 11 may be welded to a reinforcing bar 12 which may be essentially U-shaped with its legs extending into the concrete structure. If relative movement between the core member 4 and collar 11 in a particular direction is desired, the collar 11 may be provided with a slot 13 as shown in FIGURE 7.

While in most cases a series of core members 4, which are symmetrical in cross section, are preferred, in some instances it may be desirable to construct the core members 4 in the form of plates 14, as shown in transverse section in FIGURE 8.

As in the first described embodiment, one portion of the core plate 14 is anchored directly to one of the structural components and the other portion is cast within an elastomer sleeve 15. Whereas in the first described embodiment a collar 11 may be provided to limit the degree of relative movement of the structures 1 and 2, a similar effect may be obtained in the modified structure by providing ribs 16 on opposite sides of the core plate 14, as indicated in FIGURES 9 and 10.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:
1. A concrete structure comprising:
 (a) confronting concrete structural sections forming therebetween an expansion joint;
 (b) A plurality of elastomeric sleeves cast in at least one of said structural sections;
 (c) and a plurality of core members having portions embedded in and bonded to said sleeves, and portions extending into and bonded to the other of said structural sections.
2. A concrete structure as set forth in claim 1, wherein:
 (a) said core members have longitudinal axes and are symmetrical about their longitudinal axes.

3. A concrete structure as set forth in claim 2, wherein:
  (a) collars are mounted on said core members and anchored in the surrounding structure.
4. A concrete structure as set forth in claim 1, wherein:
  (a) said core members are in the form of plates.

References Cited

UNITED STATES PATENTS

| 1,723,306 | 8/1929 | Sipe | 94—18 |
| 1,935,028 | 11/1933 | Heltzel | 94—17 |
| 2,046,303 | 6/1936 | Briody | 94—8 |
| 2,149,466 | 3/1939 | Robertson | 94—18 |
| 2,201,134 | 5/1940 | Brickman | 94—18 |
| 2,205,810 | 6/1940 | Carter | 94—18 |
| 2,269,703 | 1/1942 | Bagwill | 94—18 |
| 2,305,979 | 12/1942 | Mitchell | 94—18 |
| 2,572,552 | 10/1951 | Willard | 94—8 |
| 2,912,724 | 11/1959 | Wilkes | 52—393 X |

CHARLES E. O'CONNELL, *Primary Examiner.*

JACOB L. NACKENOFF, *Examiner.*

N. C. BYERS, *Assistant Examiner.*